UNITED STATES PATENT OFFICE.

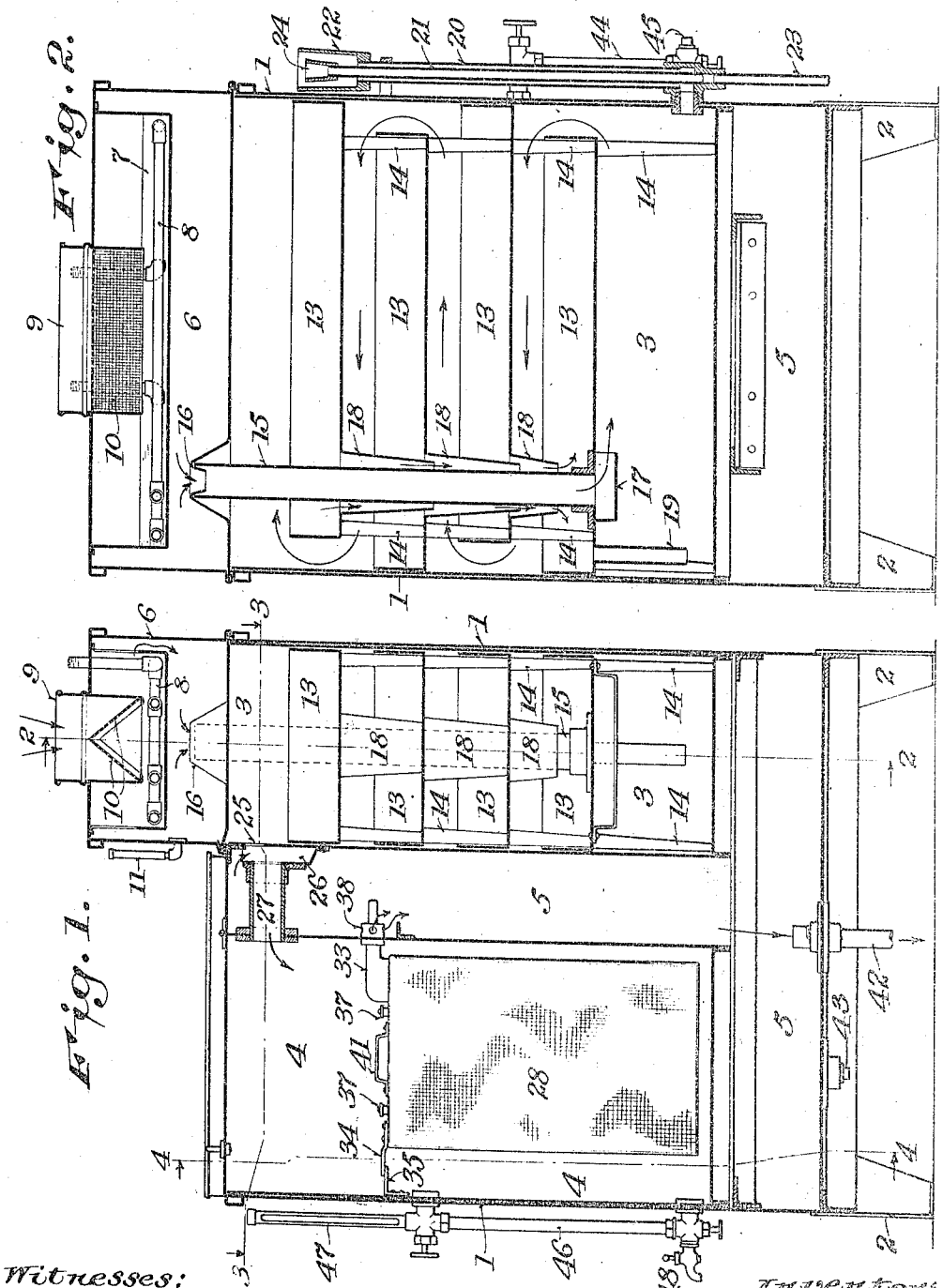

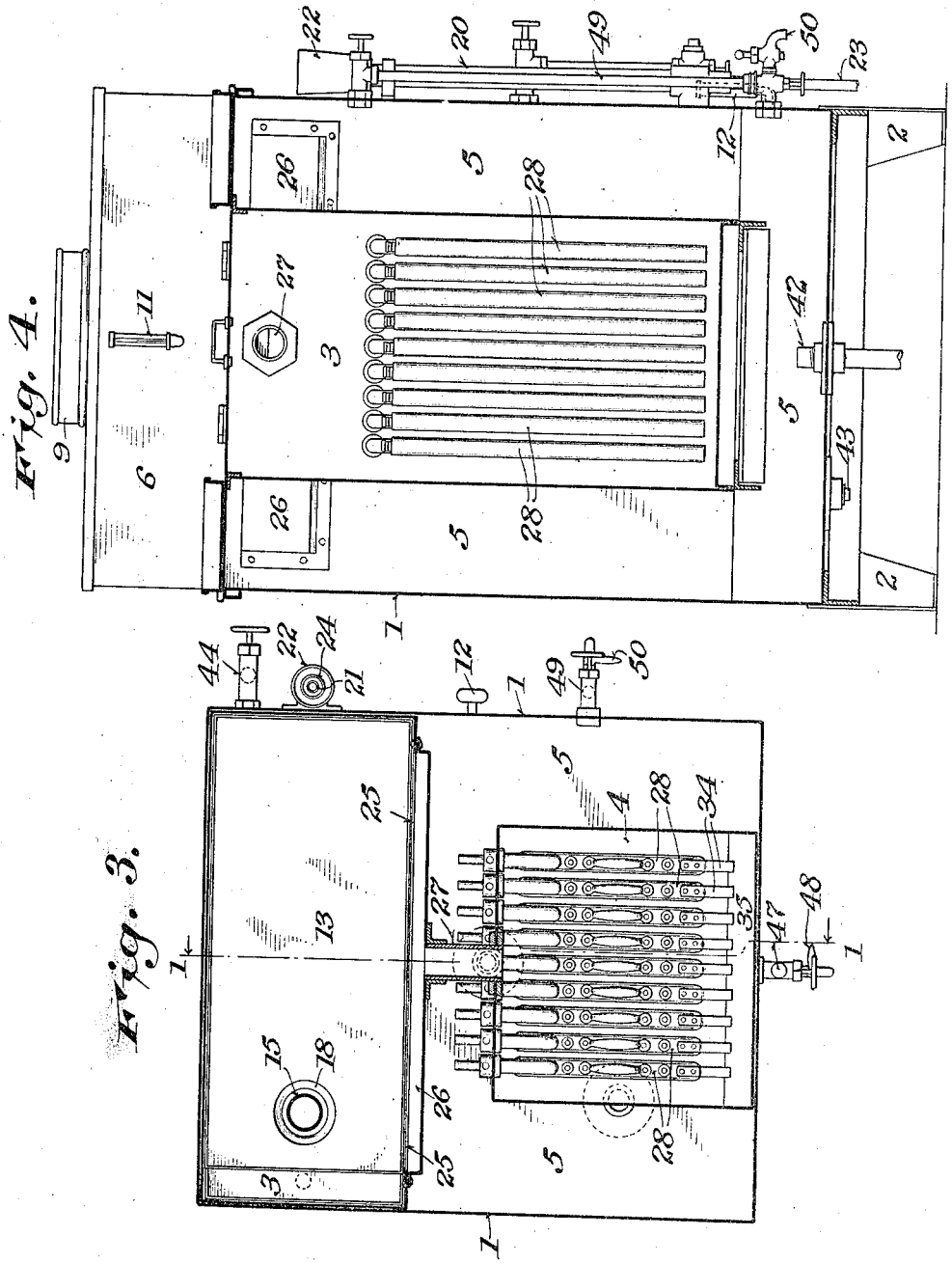

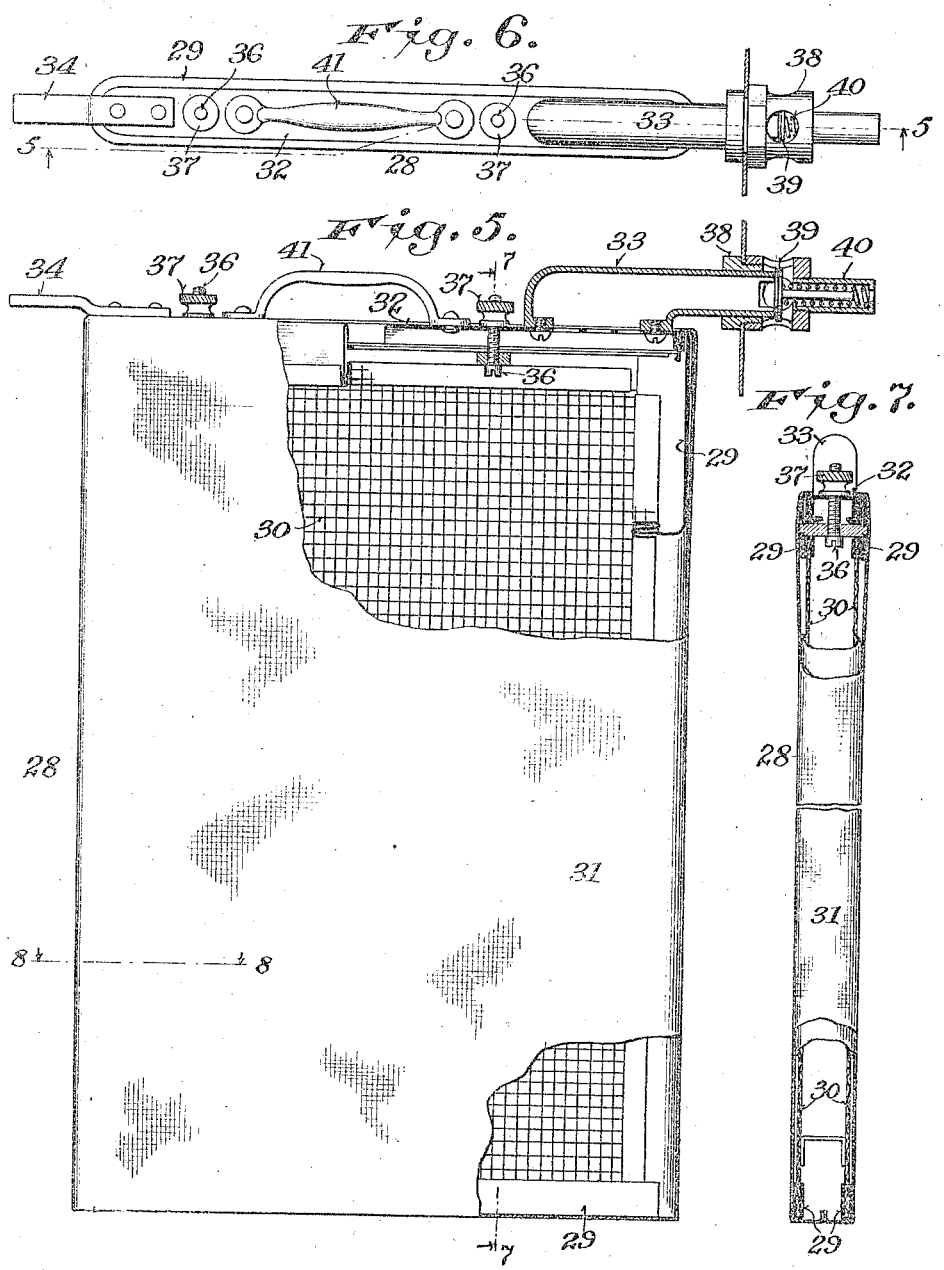

JOHN W. PETERSON AND JAMES P. QUAM, OF MILWAUKEE, WISCONSIN, ASSIGNORS TO THE RICHARDSON-PHENIX CO., OF MILWAUKEE, WISCONSIN, A CORPORATION OF WISCONSIN.

OIL-FILTER.

1,239,512.     Specification of Letters Patent.     Patented Sept. 11, 1917.

Application filed June 9, 1915. Serial No. 33,000.

*To all whom it may concern:*

Be it known that we, JOHN W. PETERSON and JAMES P. QUAM, citizens of the United States, residing at Milwaukee, in the county of Milwaukee and State of Wisconsin, have invented certain new and useful Improvements in Oil-Filters, of which the following is a specification, reference being had to the accompanying drawing, forming a part thereof.

The main objects of the invention are to secure the greatest capacity within a given compass; to facilitate access to the internal parts of the filter for cleaning, repairing or renewing the same; to maintain the same difference of pressure on opposite sides of the filter cloth and thus evenly distribute the work of filtration over its entire area; to provide for the separate removal of the several filtering units or elements without interrupting or interfering with the continuous and proper operation of the filter; to facilitate removing and replacing the filtering cloth on the frames of the several elements or units for the purpose of cleaning or renewing the same; to avoid folds and wrinkles in the cloth which would interfere with its proper action; to automatically remove water precipitated from the oil within the filter and maintain a substantially constant low water level in the precipitation compartment; to automatically regulate the head of oil in the filtration compartment and hence the rate of filtration or flow through the filtering cloth, according to varying demands on the filter; and generally to improve the construction and operation of filters of this class.

It consists in the construction, arrangement and combination of parts as hereinafter particularly described and pointed out in the claims.

In the accompanying drawing like characters designate the same parts in the several figures.

Figure 1 is a vertical cross section on the line 1—1, Figs. 3 and 4, of an oil filter embodying the invention; Fig. 2 is a vertical section of the filter on the line 2—2, Fig. 1; Fig. 3 is a horizontal section on the line 3—3, Fig. 1; Fig. 4 is a vertical longitudinal section on the line 4—4, Fig. 1; Fig. 5 is an enlarged side elevation and partial vertical section on the line 5—5, Fig. 6, of one of the filter elements; Fig. 6 is a top plan view of the same; Fig. 7 is an elevation and partial vertical section on the line 7—7, Fig. 5, of the element, a portion of which is broken away; and Fig. 8 is a partial horizontal section on the line 8—8, Fig. 5.

The filter comprises a casing 1, which is preferably made of sheet metal reinforced by metal angle and channel bars, as shown, and provided with suitable legs 2, which support the bottom of the filter above the floor or foundation on which it rests. The casing 1 is divided by partitions into a precipitation compartment 3, a filtration compartment 4, and a clean oil compartment 5, occupying the space below and between the precipitation and filtration compartments and extending around the opposite sides or ends of the filtration compartment.

A heating chamber or compartment 6, also preferably made of sheet metal, is removably mounted on the main casing 1, over the precipitation compartment 3, which it normally closes. This chamber or compartment is provided with a shallow heating tray 7, which may be suspended from the top thereof, as shown, and which is provided with a heating element such as a steam or hot air coil 8. A strainer box 9, provided with an inverted V-shaped screen or strainer 10, as shown in Figs. 1 and 2, is removably fitted in an opening in the top of the chamber or compartment 6, over the tray 7. The heating chamber 6 is provided on the front side, as shown in Figs. 1 and 4, with a thermometer 11, for indicating the temperature of the dirty or unpurified oil entering the filter, and the main casing is provided, as shown in Fig. 3, with a thermometer 12, for indicating the temperature of the oil in the clean oil compartment 5.

The precipitation compartment 3 is provided with a number of trays 13, removably fitting therein, one above another, with openings between alternate ends thereof and the ends of the compartment for the upward flow of oil from the lower part of the compartment horizontally back and forth over the several trays into the upper part of the compartment. The several trays are provided with legs 14 for supporting them at a distance from one another and from the bottom of the compartment and permitting the oil to flow horizontally over and between them. A vertical standpipe or conductor 15, is attached at its lower end to the bottom of the lowest tray adjacent to one end thereof, and at its upper end fits loosely around a raised funnel 16 in the bottom of the heating chamber 6, in open communication therewith. At the lower end of the pipe or conductor 15, which opens through the bottom of the lowest tray 13, said tray is provided with a baffle or deflecting plate 17, which spreads and directs the oil discharge from said pipe or conductor into the lower part of the precipitation compartment horizontally along the bottom of said tray toward the vertical opening at its opposite end. Each of the upper trays 13 is provided around an opening in the bottom thereof through which the pipe or conductor 15 passes, with a by-pass funnel 18, extending at its lower end into the upper larger end of a corresponding funnel of the tray next below it. The lowest tray 13 is provided between the baffle plate 17 and the adjacent end of the tray, with a pipe or spout 19 leading downwardly from an opening in the bottom of the tray into the lower part of the precipitation compartment 3, below the normal low water level maintained therein, as hereinafter explained. At one side or end thereof, the main casing is provided with an adjustable automatic water overflow communicating with the precipitation compartment 3, near the bottom. This overflow consists of two upright pipes or tubes 20 and 21, of different diameters, arranged one within the other, with a space between them. The outer pipe 20 is connected at its lower end by a suitable fitting with the lower part of the compartment 3, and at its upper end is provided with an enlargement or funnel 22, and the inner pipe 21, which is fastened and supported at its lower end in said fitting in communication with a drain or waste pipe 23, is provided at its upper end with a vertically adjustable funnel 24, which is threaded on said pipe within the funnel 22. The side wall of the compartment 3 next to the compartment 5 is formed with an oblong overflow opening 25, the lower edge of which operates as a skimmer or weir to maintain a substantially constant oil level above the top tray 13, and the overflow opening 25 communicates with an oblong pocket 26, which is connected by a pipe 27 with the upper part of the filtration compartment 4, said pipe constituting the oil supply or inlet connection of said compartment.

The filtration compartment is provided with a number of separately removable non-collapsible hollow filter units or elements 28, preferably arranged side by side parallel with one another, as shown in Figs. 3 and 4. As illustrated in Figs. 5 to 8 inclusive, these filter elements are preferably constructed as follows:

Each element comprises an oblong metal frame 29, having opposite broad parallel sides 30, made of perforated metal or coarsely woven wire, and a bag 31, smoothly and removably fitting over the frame and preferably consisting of cloth having loosely twisted woven threads, the fuzz or fibers of which close the meshes of the cloth, thereby forming an effective filtering medium which operates on the principle of capillary action. The frame is open at the top and bottom, the bottom being closed by the cloth bag and the top being internally flanged and provided with a removable cover 32, which fits into the frame and is adapted to clamp the upper inturned edge of the bag to the frame and tightly close the open top of the bag.

Each cover is provided at one end with a laterally projecting outlet nozzle or spout 33, and at the opposite end with an arm 34, which rests loosely on a horizontal angle iron support 35, in the compartment 4 when the element is placed in position therein. The cover is fastened in the frame by screws 36, extending upwardly from cross pieces in the open end of the frame and provided at their upper ends with nuts 37. The ends of the nozzles or spouts 33 are notched and removably fitted in openings in the cases 38 of self-closing valves 39. The valve cases 38 are each made in two parts which have a threaded connection with each other and are fitted and secured in openings in the upper part of the rear wall of the filtration compartment 4, with which they form tight joints, as shown in Figs. 5 and 6.

The valves 39, which are closed automatically by springs 40, are opened and held open by the notched ends of the nozzles or spouts 33, when they are inserted in the valve cases 38.

The covers 32 are provided with handles 41 by means of which they are easily removed from and replaced in the frames 29, and the filter elements 28 are removed from and replaced in the compartment 4.

By the construction and arrangement of the filter elements and their outlet connections as shown and described, a large area of the filtering cloth or medium is provided within a small compass; the greater area of the cloth is disposed in a vertical position so that the slime, sediment or impurities carried with the oil against its outer surface tends to work downward and drop therefrom, thereby making the elements to a great degree self-cleaning; substantially the entire area of the cloth becomes equally active before any oil can pass from the filtration compartment 4 into the clean oil compartment 5; the difference between the inside and outside pressures on the cloth due to the head of oil above the outlets of the elements being the same over the entire active area of the cloth; and each element can be easily removed for cleaning it and replaced without interrupting the operation of the filter or permitting unfiltered oil to pass into the clean oil compartment 5.

The purified oil is drawn off as required for use, through a pipe connection 42, leading out of the compartment 5, a short distance above the bottom thereof, so that sediment or impurities which may settle and collect at the bottom is prevented from passing out with the clean oil. A flush opening in the bottom of the casing 1, closed by a plug 43, as shown in Figs. 1 and 4, provides for draining and cleansing the clean oil compartment 5.

A gage 44 shows the water level in the lower part of the precipitation compartment 3, and a removable plug 45 in the lower fitting of this gage, affords means for drawing off the oil from said compartment for the purpose of cleaning, repairing or inspecting the same, the heating chamber 6, which normally closes said compartment at the top, and several trays 13, being easily removed. A gage 46, communicating with the filtration compartment 4, as shown in Fig. 1, and showing the level of the oil in said compartment, is provided at its upper end with an indicator 47, showing the head of oil above the outlet nozzles 33 of the filter elements. This gage is provided at its lower end with a cock 48, through which the oil may be drawn off from the compartment 4. A gage 49, showing the level of the oil in the compartment 5, is provided at its lower end with a cock 50, by means of which purified oil may be drawn from said compartment into cans for hand oiling.

In the operation of the filter, the dirty oil to be purified is pumped or conducted into the strainer box 9, where coarse impurities such as pieces of waste, are caught and held by the strainer 10. From the strainer box the oil flows into the shallow tray 7, where it comes in contact with the heating coil or element 8, by which its viscosity is reduced, so that water and other remaining impurities will readily separate therefrom by precipitation. The oil overflows from the tray 7 into the lower part of the chamber 6, in which it rises till it overflows the raised funnel 16 into the standpipe or conductor 15. Passing from the lower end of the pipe 15, the oil is spread by the baffle or deflector 17, and directed horizontally along the bottom of the lowest tray 13, toward the opening at its opposite end, through which it passes upwardly into the space between the top of said tray and the bottom of the tray next above it, as indicated by arrows on Fig. 2. From the lower part of the compartment 3, the thin heated oil flows slowly back and forth in a zigzag course between and over the several trays, passing upwardly through the openings at the opposite ends of alternate trays till it reaches the level of the outlet opening 25, or skimmer in the upper part of said compartment above the top tray. As the oil flows horizontally over the several trays, water and other impurities separate therefrom and settle in the trays, from which they pass downwardly through the funnels 18 into the lowest tray and thence through the pipe or spout 19 into the lower part of the compartment 3, without coming in direct contact with and being taken up by the slowly flowing current of oil passing over the trays. Before the filter is started, the compartment 3 is supplied with water to a level above the opening from the lower part thereof into the pipe 20 and above the lower end of the discharge pipe or spout 19 of the bottom tray. The automatic overflow, working on the principle of the U-tube, whenever the column of oil and water in compartment 3 becomes heavier than the column of water in the pipe 20, due to the increase of the quantity of water in said compartment by precipitation from the oil, the water will overflow from the funnel 22 into the funnel 24 at the upper end of the inner pipe or tube 21. A substantially constant low water level will thus be automatically maintained in compartment 3, sufficiently above the opening therefrom into the overflow to seal said opening and prevent the escape of oil through the overflow. By the adjustment of the funnel 24 up or down, the low water level in the compartment 3, as indicated by the gage 44, is regulated for oils of different specific gravities.

From the precipitation chamber 3 the oil overflows through the pocket 26 and the pipe 27, into the upper part of the filtration compartment 4, in which it rises to a level with or above the outlet connections from the upper ends of the filter elements 28. Before any oil can pass from the compartment 4 into the compartment 5, the filter elements must be entirely submerged, so that the entire area of the cloth becomes uniformly active as soon as the oil level rises to the outlet openings in the nozzles 33 and oil begins to flow from the interior of the elements 28 into the clean oil compartment 5.

The rate at which filtration takes place depends upon the head of oil above the outlets of the filter elements, and varies with variations in the rate of supply of dirty oil to the filter. The greater the head of oil above the outlets from the filter elements the greater will be the difference between the external and internal pressures on the filter cloth, and the rate of flow through the cloth, and hence from the elements through the outlet nozzles 33 into the storage compartment 5, will be increased.

The trays 13 affording an extended area for the precipitation of water and other impurities from the oil as the oil flows slowly over the trays, an extended area of cloth through which the filtering operation is evenly distributed being provided by the bags 31 covering the frames 29 without folds, and the large storage capacity of the clean oil compartment 5, provide for variations within wide limits in the demands upon the filter.

As the oil passes from the compartment 4 into the hollow non-collapsible filter elements 28, the fine impurities remaining therein are separated therefrom by the filtering cloth and gradually work down on the outer surfaces thereof and drop into the lower part of said compartment, from which they are removed from time to time.

When any of the filter elements 28 is removed from the compartment 4 for cleaning, repairing or inspecting the same, the valve 39 in the outlet connection through which it communicates with the compartment 5, is instantly closed by the spring 40, thereby preventing any unfiltered oil from passing into the compartment 5 and avoiding any interruption in the operation of the filter.

A rise of the oil in compartment 4 above a certain level, as shown by the indicator 47, when the filter is operating at its normal rate, indicates that the filter cloth is clogged and needs cleaning. However, sufficient space is provided in the upper part of the compartment 4 between the inlet pipe or connection 27 and the outlet connections 38 to allow for an increase in the head of oil above the filter elements sufficient to operate the filter at a rate to satisfy the demands thereon after the filter cloth of some or all of the elements has become dirty and more or less clogged.

Various changes in details of construction and arrangement of parts may be made without departure from the principle and scope of the invention, as defined in the following claims.

We claim:

1. In an oil filter the combination of filtration and clean oil compartments, openings provided with self-closing valves between said compartments, separately removable hollow noncollapsible filtering elements, each loosely fitting into said filtration compartment and having an outlet nozzle removably fitting into and adapted to open one of said valves when said element is placed in working position.

2. In an oil filter the combination of a filtration compartment having an outlet opening, and a hollow noncollapsible filtering element comprising a frame having perforated sides, a cloth bag removably fitted over the frame and a removable cover fitted to the open top of the frame and adapted to secure the open end of the bag thereto, the cover being provided with an outlet nozzle removably fitting into said outlet opening.

3. In an oil filter the combination of a filtration compartment having a horizontal series of self-closing outlet valves in one of its side walls below the top thereof, a number of hollow cloth-covered filtering elements removably fitting into said compartment and provided above the filtering cloth with outlet nozzles removably fitting into and adapted to open said valves, and means for maintaining a head of oil in said compartment above said outlet valves and nozzles.

4. In an oil filter the combination of a filtration compartment having a horizontal series of outlet openings in one of its side walls below the top thereof and a horizontal supporting ledge on the opposite side wall, self-closing valves connected with the outlet openings, a number of separately removable noncollapsible hollow filtering elements provided at their upper ends and on opposite sides thereof with arms adapted to rest on said supporting ledge and outlet nozzles removably fitting into said outlet openings and adapted to open said valves, said arms and nozzles being adapted to support the filtering elements in vertical positions parallel with one another in said compartment, and means for maintaining a head of oil in said compartment above said outlet openings.

5. In an oil filter the combination of a filtration compartment having a horizontal series of outlet openings in one of its side walls and a horizontal support on the opposite wall, a number of separately removable noncollapsible hollow filter elements, consisting of frames open at the tops, cloth bags removably fitting over the frames, and removable covers adapted to close and clamp the tops of the bags to the frames and provided with arms adapted to rest on said support and with nozzles removably fitting into said outlet openings, and means for maintaining a head of oil in said compartment above said outlet openings.

6. In an oil filter the combination of a casing having a clean oil compartment and a filtration compartment provided with an oil inlet connection, a hollow non-collapsible filter element removably fitted in the filtration compartment and having a detachable outlet connection with the clean oil compartment above the filtering area of the element, and a self-closing valve in said outlet connection adapted to be opened by the insertion of the filtering element in place.

7. In an oil filter the combination of a casing containing filtration and clean oil compartments, an oil inlet connection opening into the filtration compartment, a series of hollow filtering elements removably fitted in the filtration compartment and having detachable outlet connections with the clean oil compartment above the filtering area of the elements, and self-closing valves in said outlet connections adapted to be opened by the insertion of the filtering elements in place.

8. In an oil filter the combination of a casing containing a clean oil compartment and a filtration compartment having an oil inlet connection and outlet openings into the clean oil compartment below the top of the filtration compartment, self-closing valves in said outlet openings, and a number of hollow filtering elements fitted in and separately removable from the filtration compartment and having outlet nozzles fitting into said outlet openings above the filtering area of the elements and adapted when inserted in said openings to open said valves.

In witness whereof we hereto affix our signatures in presence of two witnesses.

JOHN W. PETERSON.
JAMES P. QUAM.

Witnesses:
  CHAS. L. GOSS,
  ALICE E. GOSS.